Dec. 18, 1962 G. H. DAMON ET AL 3,069,300
BORON CONTAINING FUEL AND FUEL IGNITER FOR RAM JET AND ROCKET
Filed Dec. 30, 1954

INVENTORS
GLENN H. DAMON
JOHN RIBOVICH
JOSEPH A. HERICKES
BY
ATTORNEYS

United States Patent Office 3,069,300
Patented Dec. 18, 1962

3,069,300
BORON CONTAINING FUEL AND FUEL IGNITER FOR RAM JET AND ROCKET
Glenn H. Damon, Pittsburgh, John Ribovich, McKeesport, and Joseph A. Herickes, East McKeesport, Pa., assignors to the United States of America as represented by the Secretary of the Navy
Filed Dec. 30, 1954, Ser. No. 478,949
3 Claims. (Cl. 149—22)
(Granted under Title 35, U.S. Code (1952), sec. 266)

The invention described herein may be manufactured and used by or for the Government of the United States of America for governmental purposes without the payment of any royalties thereon or therefor.

This invention relates to fuels suitable for thermal jet engines, such as the ram jet and turbo jet, as well as for force-feed furnaces, rockets, and similar apparatus.

It is customary to use liquid fuel for jet engines, but such use is known to have certain pronounced disadvantages. For example, while liquid fuels have a high energy content per unit weight their relative low densities necessitates large fuel tanks, they tend to burn erratically at high altitudes and, in general, they require complex controls to secure satisfactory regulation of flow. In addition, liquid fuel ram jets have poorer performance than solid fuel ram jets of comparable size, the former requiring approximately twenty percent increase in length and twenty percent increase in weight to secure equivalent net thrust and thrust coefficients.

It is accordingly an object of this invention to provide a solid fuel usable for jet engines and the like which is efficient in use as compared to liquid fuels.

A further object is to provide a solid fuel which is readily ignitable in the presence of high speed air flow.

An object, also, is to provide a solid fuel which, although independent of air flow for ignition, normally requires air flow for complete combustion.

Still other objects are to provide a solid fuel which is readily controlled as to rate of combustion, which does not require binders, and which burns readily upstream from a point of ignition.

An important object of the invention is to combine boron in the fuel composition in such a manner as to secure exceptionally high burning rate.

An object also is to provide a solid fuel furnace arrangement, including gas mixing apparatus, which will secure approximately complete combustion of the fuel.

Other objects and features of the invention will appear on consideration of the following description of the fuel composition and apparatus reference being made to the accompanying drawing in which.

Figure 1:
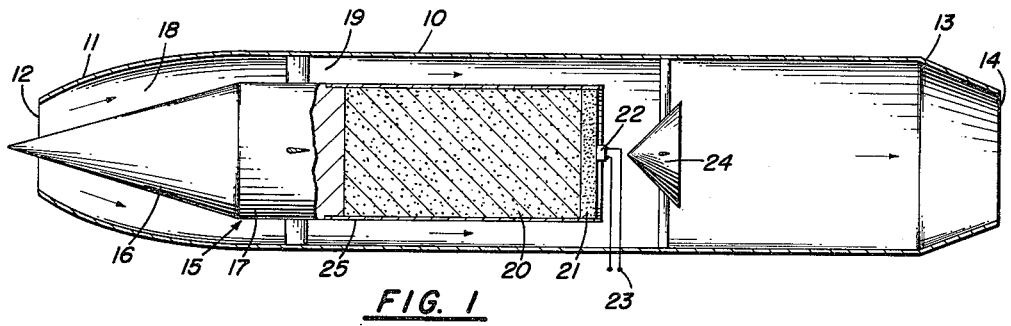
FIG. 1 is a view of a ram jet with a solid fuel charge therein.

The arrangement of FIG. 1 includes a cylindrical casing 10 having an entrance section 11 tapered toward the casing axis to form an inlet 12, and an outlet section 13 also tapered toward the casing axis to form a constricted outlet 14 for high pressure fuel gas.

In the upstream end of the casing is an axially positioned diffuser 15 having a conical section 16 and a cylindrical skirt section 17, the cone tip lying forward on the casing axis and the cone surface forming with the entrance section 11 an inlet passageway 18 of progressively decreasing thickness terminating at a point adjoining an annular passageway 19 formed by the casing wall and the cylindrical skirt section 17. Passageway 19 is continued by the space formed between the casing wall and the fuel charge in the form of a solid cylindrical briquet 20 having a diameter equal to that of the diffuser skirt 17 and such length as may meet the purpose of the jet engine. The briquet is encased in a thin shell 25 formed of combustible metal, plastic or paper. Magnesium, being both readily combustible in air and heat liberating, has been found to be particularly useful. The downstream end of the briquet is formed with a terminal layer 21 of igniter material and an electric squib 22 actuated by power from electric power lines 23 is used to kindle the igniter. The igniter material may be identical to the fuel in composition but more loosely compacted so as to permit more rapid heat spread. Increased proportions of oxidants may also be used to increase the burning rate.

Downstream of the charge igniter is a turbulator 24 consisting of a conical mass with its main axis coinciding with the casing axis and its cone point upstream, thus forming a gas flow diverting and mixing element for securing approximately complete combustion of the fuel.

In operation, after the desired airflow in the arrow direction is established, the squib is actuated thus energizing the igniter 21 and igniting the fuel 20 adjacent the igniter. The fuel then burns as a cigarette, moving upstream at a rate predetermined by the quantity of fuel oxidant, the particle size of the oxidant, the compactness of the charge and the composition ingredients of the fuel. Burning particles are blown off the charge mass by the air flow and carried past the turbulator 24 where they are thoroughly mixed with the air to complete combustion. The heated gases are then projected through the constricted outlet 14, thus developing thrust for jet propulsion.

In the use of the described burner, the nature of the fuel becomes an important consideration since it must have high energy content, develop thrust rapidly and function without complete dependence on air flow. A fuel found adequate to these demands may be selected from one of the following compositions, parts by weight being given:

| Material | A | B | C |
| --- | --- | --- | --- |
| Aluminum | 37.5 | 55.0 | 15.0 |
| Magnesium | 37.5 | | 45.0 |
| Boron | | 10.0 | 10.0 |
| Potassium nitrate | 17.9 | 25.0 | 21.4 |
| Copper sulphate | 7.1 | 10.0 | 8.6 |

Preferably pyrotechnic aluminum and anhydrous copper sulphate are used. The constituent ingredients are ground to particle size, this being important as affecting efficiency through complete reaction and uniformity in the rate of burning. Particularly, the rate of burning increases with decrease in size of the oxidant particles, (potassium nitrate, copper sulphate). The substances are then mixed thoroughly in appropriate equipment and then pressed, as briquets, into the desired forms. For the solid briquet of FIG. 1, the powder is placed in a thin walled shell of magnesium which, in turn, is encased by a heavy-walled steel mold. A case hardened steel-tipped plunger is then applied, gauge pressures up to 45,000 pounds per square inch being used. Desirably a lubricant such as a plasticized nitrocellulose is coated over the inner surface of the magnesium tube to facilitate assembly, to prevent tube shrinkage and to retard or prevent accelerated peripheral burning in the combustion process. By preventing powder from entering the clearance space between plunger and shell, an easy sliding action of the plunger is secured and avoidance of tube compression and contraction.

The significant factor of the mentioned compositions is that each is formed of reductants and oxidants, the proportional amounts of reductants and oxidants being non-critical but the oxidant proportions being always less than the stoichiometric value of the compounds produced by the combination of the oxidant and reductant. In other words, both classes of ingredients are required, but the percentage of oxidants depends on the rate of combustion and the thermal energy per unit volume desired, having in mind that air supplies part of the needed oxygen. In general, self propagation of fuel is obtained with oxidant concentrations as low as 5 percent by weight, with the fastest burning rates occurring in the range of 25 to 35 percent, at all densities. The composition examples, therefore, are typical and not restrictive, except with reference to boron, which will now be considered.

To insure optimum heat energy content in the fuel it is usually desirable to eliminate a binder as not contributing importantly either to flow rate or energy. Consequently, high pressures are required to secure coherence of the forming powders, and the resultant high density tends to slow down combustion below the 0.3 to 2.0 inches per second rate required for efficient use of the described burner form of FIG. 1. It has been discovered, however, that the addition of a small percentage of boron not only adds appreciable heat energy to the composition but also markedly increases the rate of heat flow. For example, if 15 percent boron is substituted for aluminum in a composition of 70 percent aluminum and 30 percent oxidants, the flow rate is increased 20 to 50 percent. In a similar composition containing 70 percent magnesium and 30 percent oxidants, 15 percent boron substituted for magnesium increases the burning rate of the solid briquet from 0.6 inch to 1.2 inches a second, an increase of 100 percent. In addition the heat release of boron is high, approaching the theoretical limit of some 25,000 B.t.u./lb. Peculiarly, boron functions in the composition as above described only in the absence of a binder as an ingredient.

The heat flow from the solid fuel type charge is dependent upon the burning surface area, the inherent burning rate of the fuel mixture and the pressure prevailing in the engine. An important advantage of the cigarette type charge, therefore, lies in its constant burning area, this giving a basis for close control of burning rate. Further, this type charge by its central and symmetrical placement has a low drag coefficient; and the use of the turbulator in the flow stream below the charge enforces a thorough mixing of the burning fuel particles with air and final complete combustion. Through this turbulator use, it has become possible to decrease the length of the engine combustion chamber to practical limits, to increase the combustion efficiency from about 25 percent to about 75 percent and to increase the over-all engine performance. Air specific impulses of 100 to 185 lbs./secs. per pound of air have been attained for fuel-air ratios in the range of 0.5 to 0.3.

Figure 2:
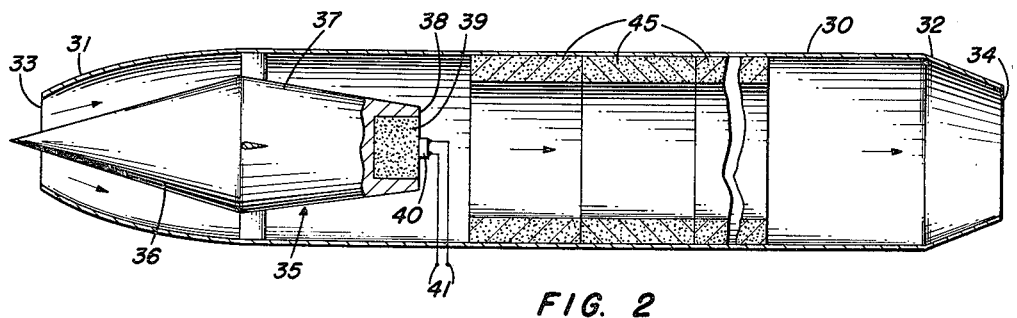
FIG. 2 is a view of a ram jet with a modified fuel arrangement.

While the fuel composition including oxidants and reductants, as hereinabove described, has particular utility in the arrangement of FIG. 1, such compositions are also usable in other arrangements, as shown for example, in FIG. 2 and set out in detail in the copending application of Glenn H. Damon and John Ribovich, Serial No. 423,262, filed April 14, 1954.

In this alternative arrangement the cylindrical casing 30 is fashioned for ram jet use with the constricted inlet and outlet sections 31 and 32, defining the inlet and outlet 33 and 34, respectively. The diffuser 35 is formed with a cone section 36 and a coaxial truncated cone section 37, these sections having abutting bases with the cone section apex upstream and extending beyond the inlet opening, and the truncated section 37 extending a short distance downstream. The downstream end 38 of the truncated section is recessed to receive an igniter 39 composed of a loosely pressed mixture of the fuel material, of the same proportion of oxidants and reductants or of increased oxidants to speed the igniting action.

An electric squib 40, adapted for actuation through power lines 41, kindles the igniter.

Downstream of the igniter is the fuel bed in the form of tubular briquets 45. These briquets are made from oxidants and reductants as in the previously described fuels but differing in the absence of boron and the use of a binder. Typical compositions follow, parts by weight being given:

| Material | D | E |
|---|---|---|
| Aluminum | | 31.9 |
| Magnesium | 30 | 31.9 |
| Coal | 45 | |
| Potassium nitrate | 10 | 15.2 |
| Copper sulphate | | 6.0 |
| Binder | 15 | 15.0 |

The binder may be a plasticized nitrocellulose, rubber cement, asphalt, latex, linseed oil or polymerizable resins. The copper sulphate is anhydrous.

In making the briquets, the finely ground component substances are mixed thoroughly and pressed into form, obtaining densities ranging from about 1.4 to 1.9 gm./cc., in accordance with the particular composition and pressures used. A curing procedure, dependent on the type of binder, is then employed and the briquets are then ready for end to end insertion in the combustion chamber of the casing 30.

In operation, air is passed through the casing as indicated by the arrows, and at the desired speed of flow the squib is activated to kindle the igniter. Whereupon, burning igniter particles in molten form are caught up by the air-stream and sprayed over the inner surfaces of the briquets igniting the same, the briquets burning radially. The small concentration of oxidant in the fuel promotes rapid ignition and ready propagation of the burning front, while the airstream completes the oxidation of the fuel. Thus, oxygen in both oxidant and air has a necessary function in the combustion of the fuel, as in the modification of FIG. 1.

In describing the invention two structural forms have been indicated with specified substances forming the fuel and igniter. Obviously, modifications and substitutions are available, not only in the structure and materials but in the proportions of substances used. For example, the ratio of oxidants to reductants may be varied over a wide range, self propagation of burning being secured with oxidant concentrations as low as 5 percent.

Also, while aluminum, magnesium and other reductants and potassium nitrate and other oxidants are specified, these are mentioned by way of example, many other reductants and oxidants being usable. Thus, all or part of the aluminum included in the described compositions may be replaced by magnesium or one or more of the following reductants: boron, carbon, boron carbide ($B_4C$), magnesium carbide ($Mg B_6$), sulphur, lithium boron hydride ($LiBH_4$), titanium, titanium hydride ($TiH_2$), zirconium, zirconium hydride ($ZrH_2$), and other similar metals, hydrides and metallic alloys. All or part of the magnesium may be replaced by aluminum or one or more of the substances mentioned in the above sentence. All or part of the coal may be replaced by magnesium, boron, carbon, zirconium, boron carbide ($B_4C$) magnesium boride ($MgB_6$), sulphur, lithium boron hydride ($LiBH_4$), titanium, titanium hydride ($TiH_2$), lithium hydride ($LiH$), zirconium hydride ($ZrH_2$), and other similar metals, hydrides and metallic alloys. All or part of the copper sulphate and potassium nitrate may be interchanged or replaced by potassium nitrate ($KNO_3$), sodium nitrate ($NaNO_3$), ammonium perchlorate ($NH_4ClO_4$), potassium perchlorate ($KClO_4$), or the nitrates, chlorates, sulfides and oxides of other metals having similar properties.

Plasticized nitrocellulose has been specified as the lubricant used on the inner magnesium tube wall, this term being used since a large variety of plasticizers may be used, over twenty which were examined being found satisfactory. Dibutyl-phthallate may be mentioned by way of example, as a specific plasticizer. The lubricant is made by dissolving 25 percent by weight of the alcohol-wet nitrocellulose in 75 percent by weight of plasticiser, and subjecting the solution to agitation for several hours, to obtain a homogeneous, viscous product.

In structure, while an outwardly deflecting turbulator is shown in FIG. 1, wall deflectors moving the air into a central fuel stream may obviously be employed. Also, while electric squibs are described as initiators, other devices, such as gas flames, black powder, electric sparks and spontaneous chemical reactions, such as that of glycerin on powdered potassium permanganate ($KMnO_4$), may be used. In addition, the use of a single axial charge in the combustion chamber is illustrative, a bank of parallel small diameter charges being an effective alternative arrangement. Also, the hollow briquet may be used jointly with the solid cigarette type, either in series or the briquet enclosing the other charge. To modify the fuel rate, also, the charge may be in series segments of different specific compositions and burning rates.

Dominant advantages of the fuel systems, as described, include the following items:

By using air as a collateral oxydizing agent in fuel combustion, it is necessary only to employ sufficient oxidants to obtain the desired burning rate, thereby insuring a high thermal fuel capacity.

A pronounced flexibility in control of the fuel burning rate possible by variation in the proportion and particle size of oxidants in the fuel.

By use of boron, compressed powdered fuels without binders may be burned successfully in ram jets, giving increased heat content per unit volume of fuel.

With boron, the rate of burning is largely increased without reduction in the heat release of the fuel. By using a magnesium enclosure on the solid type briquet erratic peripheral burning of the charge is prevented.

Modifications of the heating unit and compositions other than herein above stated may be made and hence no restriction of the disclosure is intended other than may be required by the claims hereto appended.

What is claimed is:

1. A solid fuel briquet for forced air flow combustion chambers consisting of a reductant component, an oxidant component, and a third component giving both increased heat content per unit volume of fuel and increased rate of burning, said reductant component being selected from the group consisting of magnesium, aluminum, carbon, boron carbide, magnesium carbide, magnesium boride, sulphur, lithium boron hydride, lithium hydride, titanium, titanium hydride, zirconium and zirconium hydride and mixtures thereof, said oxidant component being selected from the group consisting of copper sulphate, potassium nitrate, sodium nitrate, ammonium perchlorate and potassium perchlorate and mixtures thereof, and said third component being boron, said boron concentration being from about 10 percent up to about 15 percent of the fuel mixture, said oxidant component concentration being between about 5 percent of the fuel mixture and a value for which the oxygen content of the oxidants is less than the stoichiometric value for the compounds resulting from the combination of said oxidant component with said reductant component and said third component, boron.

2. A solid fuel briquet for forced air flow combustion chambers consisting in parts by weight of aluminum 55.0, boron 10.0, potassium nitrate 25.0 and copper sulphate 10.0.

3. A solid fuel briquet for forced air flow combustion chambers consisting in parts by weight of aluminum 15.0, magnesium 45.0, boron 10.0, potassium nitrate 21.4 and copper sulphate 8.6.

References Cited in the file of this patent

UNITED STATES PATENTS

| | | |
|---|---|---|
| 1,388,501 | Aurand | Aug. 23, 1921 |
| 1,785,529 | Pratt | Dec. 16, 1930 |
| 2,309,978 | Pratt | Feb. 2, 1943 |
| 2,477,549 | Van Loenen | July 26, 1949 |
| 2,530,493 | Van Loenen | Nov. 21, 1950 |
| 2,637,274 | Taylor et al. | May 5, 1953 |
| 2,684,570 | Nordfors | July 27, 1954 |
| 2,696,076 | Weeks | Dec. 7, 1954 |
| 2,710,793 | Hutchison | June 14, 1955 |

OTHER REFERENCES

Healy: Astronautics, No. 53, October 1942, pp. 3–7.